Patented Nov. 11, 1924.

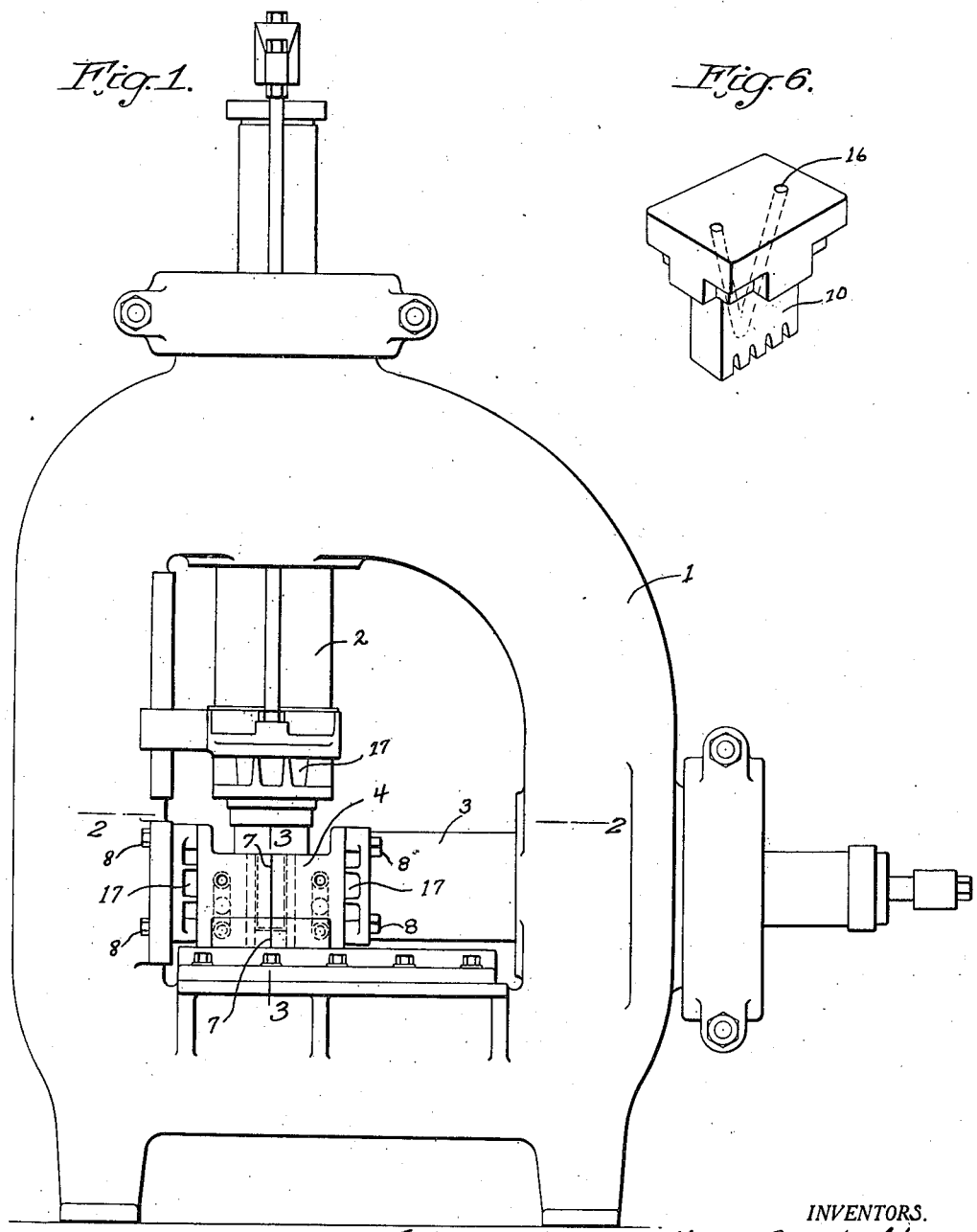

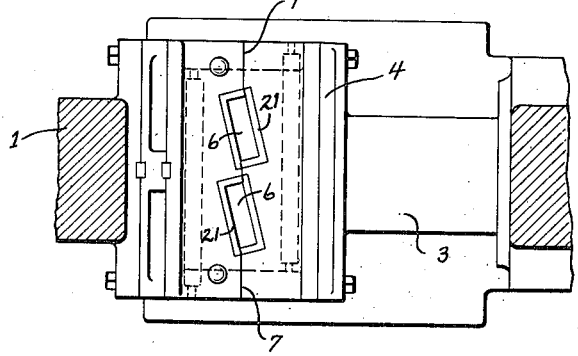
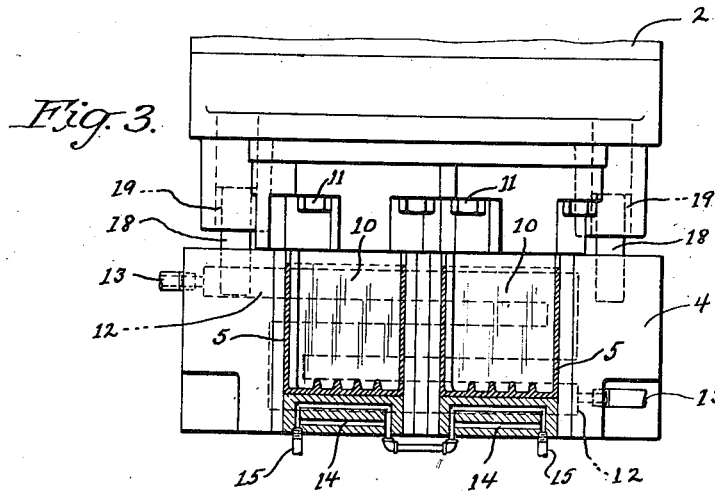
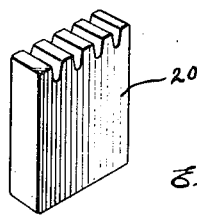
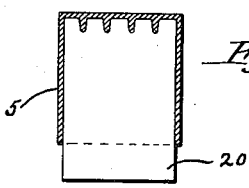

1,515,381

UNITED STATES PATENT OFFICE.

EDWIN S. BOYER, OF PLAINFIELD, AND ALFRED C. BUTTFIELD, OF BUTLER, NEW JERSEY, ASSIGNORS TO AMERICAN HARD RUBBER CO., OF NEW YORK, N. Y., A CORPORATION OF NEW YORK.

METHOD OF MANUFACTURING BATTERY JARS AND SIMILAR ARTICLES OF HARD RUBBER.

Application filed February 23, 1924. Serial No. 694,542.

*To all whom it may concern:*

Be it known that we, EDWIN S. BOYER, residing at Plainfield, in the county of Union and State of New Jersey, and ALFRED C. BUTTFIELD, residing at Butler, in the county of Morris and State of New Jersey, both citizens of the United States, have jointly invented a new and useful Method of Manufacturing Battery Jars and Similar Articles of Hard Rubber, of which the following is a specification.

This invention relates to the manufacture of hard rubber battery jars and similar articles, and involves a process, which comprises a quick setting hard rubber compound adapted to be pressed in a heated mold under high pressure, from which it can be removed, in a short period of time, while in a partly cured condition, and placed upon a suitable form or mandril for vulcanization.

The invention further relates to an apparatus for molding hard rubber battery jars and similar articles, in accordance with the above process, which comprises a high pressure press, provided with a plunger and a sectional mold, from which the molded article can be removed in a partly cured condition and placed upon separate independent forms or mandrils for vulcanization.

In the drawings:—

Figure 1 is a side elevation of a high pressure press made in accordance with the present invention.

Figure 2 is an enlarged detail top view of the mold on the line 2—2 of Figure 1.

Figure 3 is an enlarged detail side view of the mold and plunger, partly in section, and with parts broken away.

Figure 4 is an enlarged detail perspective view of a form or mandril.

Figure 5 is an enlarged detail side view of a form or mandril showing in cross section a molded article placed thereon.

Figure 6 is an enlarged detail perspective view of the plunger.

Hard rubber battery jars and similar articles made of hard rubber have heretofore usually been put together from tin covered sheets of hard rubber compound, in a plastic state, placed over a mandril by hand, or hand operated means, and then vulcanized, a slow, laborious process. Or the same have been pressed in a mold from hard rubber compound in a plastic state and then vulcanized in the mold. The difficulty with this last named process is that it requires the use of a large number of very expensive molds, if anything like a quantity production is required, as it takes several hours to vulcanize the article in the mold, during which time the mold is useless for any other purpose. Another disadvantage of this method is that it takes an appreciably period of time to place a new mold in the press, as the same has to be carefully centered in relation to the plunger, as the sides of the article are frequently thin and a true setting is essential. To procure good results it is also essential to have the mold hot before articles are pressed therein, to keep a large supply of heavy heated molds on hand ready to be used in the press, and the accompanying difficulty of centering hot molds makes this method of production slow and expensive.

Referring to the drawings, 1 designates the frame of a high pressure press, provided with a vertical ram 2 and a horizontal ram 3, each of which is arranged to be operated independently, by suitable hydraulic means for example, that it is not necessary to describe in detail further than to say that the press in the present instance is capable of exerting a pressure of approximately one hundred and fifty tons.

In the present instance and in accordance with the present invention, a sectional mold 4 is provided for making two battery jars 5 through the medium of suitable cavities 6, although the mold can be designed for making a less or greater number of battery jars or other articles. In the present instance the mold 4 is arranged to separate through the cavities 6 along the line 7—7, one section of the mold being secured to one side of the press by means of suitable bolts 8, whereas the other section of the mold is secured to the end of the ram 3 by means of suitable bolts 9, from which it follows that the mold can be separated when desired by operating the ram 3.

The mold 4 is arranged to be closed by means of suitable plungers 10 secured to the end of the ram 2 by means of suitable bolts 11. In the present instance two plungers 10 are provided one for each of the mold cavities 6, the same being suitably shaped, one in respect to the other, so that the plungers will form the inside of the battery jars and the cavities will form the outside of the battery jars when a suitable hard rubber compound is pressed therein.

In order to facilitate the easy flowing of the hard rubber compound in the mold cavities 6 when the plungers 10 are forced into closed position by the action of the ram 2, it is necessary to provide suitable heating means for the mold and the plungers. The side of each section of the mold 4 is provided with an internal continuous back and forth passageway 12, adjacent the sides of the mold cavities 6, which terminate in hose connections 13. The bottom of each section of the mold is also provided with an internal continuous back and forth passageway 14, adjacent the bottom of the mold cavities 6, which terminate in hose connections 15. Steam is admitted to the hose connections 13 and 15 for keeping the mold 4 hot. The plungers 10 are also each provided with an internal continuous back and forth passageway 16, through which steam is admitted, from connections not shown, for keeping the plungers hot. Suitable air passageways 17 at the sides and bottom of the mold and at the top of the plungers are provided for heat insulating the frame of the press and the rams.

In order to insure proper centering of the plungers 10 with the mold cavities 6 suitable guide pins 18 are provided which are secured at one end to the section of the mold secured to the press frame the free ends of the pins adapted to enter suitable holes 19 in the end of the ram 2.

In the present instance and in accordance with the present invention a quick setting hard rubber compound is provided which is inserted in the mold cavities 6, to the proper amount by weighing, after which the ram 2 is operated to force the plungers 10 into position to form the battery jars or other articles, the mold and plungers being heated as above described, to facilitate the quick setting compound being readily compressed to fill all of the interstices of the mold cavities.

When the mold cavities have been filled in this manner, pressure is continued on the heated mold and plungers for approximately one minute, after which the rams 2 and 3 are operated to withdraw the plungers and open the mold. The battery jars or other articles now have a preliminary set or are in a partly cured condition which will permit of them being readily removed from the mold cavities and plungers by hand and inserted on suitable mandrils 20, preferably a little longer than the battery jar or other article, to permit of the same being handled and placed in the vulcanizer for vulcanizing.

The mold cavities 6 may if desired be provided with detachable plates 21 which line the sides of the mold, making it easier to remove the molded article, after which the plates are easily replaced.

A quick setting hard rubber compound made in accordance with the present invention is made up in the present instance of the following ingredients, by weight, as follows:—

Rubber 34.6—hard rubber dust 20.6—sulphur 13.6—oil 3.6—mineral rubber 3.4—silica 20.6—zinc oxide 3.0—triphenylguanidine .6.

In place of triphenylguanidine, hexamethylenetetramine, piperidinepiperidyldithiocarbonate, or accelerators derived from organic or aniline bases may be used.

The addition of the accelerator in the formula above set forth produces a quick setting hard rubber compound that will, when subjected to high pressure in a heated mold, set sufficiently in approximately one minute, to permit a battery jar, or other article, being removed from the mold by hand and placed upon a separate independent mandril for vulcanizing.

A quick setting hard rubber compound used in the press, as above described, acts to permit of the press and the mold being kept constantly in use with little loss of time, resulting in a large amount of battery jars or other articles being turned out by the use of one press and one mold, which are always heated and in position to facilitate quick operation. The independent mandrils, upon which the battery jars, or other articles, are placed after being removed from the mold are cheap and inexpensive and are not to be compared with the cost of the plungers used in the press, nor do they have to be adjusted or otherwise fitted for use, the same being used simply as supports or forms for holding the battery jar, or other article, during vulcanization.

It is of course obvious that if an accelerator was not used in the making of the hard rubber compound, in order to give a preliminary set to the same, when subjected to pressure in a heated mold, it would not be possible to remove the same before vulcanization, as the compound would stick and be incapable of being handled without deformations, as it would be sticky and easily torn.

Accelerators of different kinds and in different amounts have previously been used to shorten the period of vulcanization, but the same have not been used to give a preliminary set to the compound when subjected to heat and pressure in a mold to permit of the molded article being removed from the mold in a short period of time.

to be placed upon an independent form or mandril for vulcanization.

The formula of the quick setting hard rubber compound, above set forth, will act to give uniform results when used as above described, but the same is subject to variations when a quicker or slower setting of the compound is desired.

While the invention has been described with particular reference to details, the same is not to be considered as limited thereto, as many changes can be made and still fall within the scope of the invention set forth in the following claims.

What we claim is:

1. The method of making hard rubber articles, which consists in providing a quick setting hard rubber compound, pressing the same under high pressure in a heated mold until the same has received a preliminary set, removing the same from the mold while the same is still in a partly cured condition, and placing the same upon supporting means for vulcanizing.

2. The method of making hard rubber articles, which consists in providing a hard rubber compound with an accelerator, said accelerator being sufficient in amount to give a preliminary set to the compound when subjected to high pressure in a heated mold, so that the molded compound can be removed from the mold in a partly cured condition to be placed upon supporting means for vulcanizing.

3. The method of making hard rubber articles, which consists in providing a hard rubber compound with an accelerator, said accelerator being sufficient in amount to give a preliminary set to the compound when subjected to high pressure in a heated mold, so that the molded compound can be removed from the mold in a partly cured condition in approximately one minute, to be placed upon supporting means for vulcanizing.

4. The method of making hard rubber articles, which consists in providing a hard rubber compound with an accelerator, said accelerator being sufficient in amount to give a preliminary set to the compound, in a short period of time, when subjected to high pressure in a heated mold, so that the molded compound can be removed from the mold in a partly cured condition in a short period of time to be placed upon supporting means for vulcanizing.

5. The method of making hard rubber articles, which consists in providing a hard rubber compound with an accelerator, said accelerator being sufficient in amount to give a preliminary set to the compound, in approximately one minute, when subjected to high pressure in a heated mold, so that the molded compound can be removed from the mold in a partly cured condition, in approximately one minute to be placed upon supporting means for vulcanizing.

In testimony whereof we have signed this specification in the presence of two subscribing witnesses.

EDWIN S. BOYER.

Witnesses as to Edwin S. Boyer:
WM. W. WAITING,
FREDERIC Z. ACHELIS.

ALFRED C. BUTTFIELD.

Witnesses as to Alfred C. Buttfield:
MAX J. HUSSELRATH,
JOHN A. ADKINS.